United States Patent [19]

Fisch et al.

[11] Patent Number: 5,901,297
[45] Date of Patent: May 4, 1999

[54] INITIALIZATION MECHANISM FOR SYMMETRIC ARBITRATION AGENTS

[75] Inventors: Matthew A. Fisch; Michael W. Rhodehamel; Nitin Sarangdhar, all of Beaverton, Oreg.

[73] Assignee: Intel Corporation, Santa Clara, Calif.

[21] Appl. No.: 08/974,750

[22] Filed: Nov. 19, 1997

Related U.S. Application Data

[63] Continuation of application No. 08/600,802, Feb. 13, 1996, abandoned, which is a continuation of application No. 08/205,035, Mar. 1, 1994, Pat. No. 5,515,516.

[51] Int. Cl.$^6$ ............................................ G06F 13/362
[52] U.S. Cl. ........................................ 395/294; 395/293
[58] Field of Search ................................. 395/280–310, 395/828

[56] References Cited

U.S. PATENT DOCUMENTS

| | | |
|---|---|---|
| 4,313,196 | 1/1982 | Oblonsky . |
| 4,375,639 | 3/1983 | Johnson, Jr. . |
| 4,747,100 | 5/1988 | Roach et al. . |
| 4,785,394 | 11/1988 | Fischer . |
| 4,792,955 | 12/1988 | Johnson et al. . |
| 4,975,831 | 12/1990 | Nilsson et al. . |
| 4,982,400 | 1/1991 | Ebersole . |
| 5,151,994 | 9/1992 | Wille et al. . |
| 5,204,669 | 4/1993 | Dorfe et al. . |
| 5,230,044 | 7/1993 | Cao et al. . |
| 5,239,630 | 8/1993 | Lary et al. . |
| 5,274,767 | 12/1993 | Maskovyak . |
| 5,297,067 | 3/1994 | Blackborow et al. . |

FOREIGN PATENT DOCUMENTS

| | | |
|---|---|---|
| 0432463A2 | 6/1991 | European Pat. Off. . |
| 2048619 | 12/1980 | United Kingdom . |
| 2126848 | 3/1984 | United Kingdom . |
| 2165726 | 4/1986 | United Kingdom . |
| 2216368 | 10/1989 | United Kingdom . |

OTHER PUBLICATIONS

Search Report from The U.K. Patent Office dated Feb. 28, 1995.

Popescu, Val, Merle Schultz, John Spracklen, Gary Gibson, Bruce Lightner and David Isaman, "The Metaflow Architecture", IEEE Micro, Jun. 1991, pp. 10–13 and 63–73.

Intel Corporation, Multibus II Bus Architecture Specification Handbook, "Parallel System Bus Specification", 1984, pp. 2–33 to 2–41.

Primary Examiner—Ayaz R. Sheikh
Assistant Examiner—David A. Wiley
Attorney, Agent, or Firm—Blakely, Sokoloff, Taylor & Zafman LLP

[57] ABSTRACT

An initialization mechanism for symmetric arbitration agents ensures that multiple agents on a bus are each initialized with a different arbitration counter value. The arbitration counter of each bus agent is used to keep track of which agent was the last or current owner of the bus and which agent will be the next owner of the bus. All bus agents agree on which agent will be the priority agent at system reset and thus be allowed first ownership of the bus. Each agent's arbitration counter is initialized according to each agent's own agent identification. The arbitration pins of the bus agents are interconnected such that each agent determines for itself a unique agent identification based on which pin of its arbitration pins is active at system reset and the maximum number of bus agents allowed on the bus. After determining its agent identification, each bus agent initializes its arbitration counter such that every agent agrees which agent is the priority agent. Each agent performs this initialization based on its agent identification, the identity of the priority agent, and the maximum number of agents allowed on the bus.

6 Claims, 4 Drawing Sheets

INITIALIZATION MECHANISM FOR SYMMETRIC ARBITRATION AGENTS

RELATED APPLICATION

This is a continuation of application Ser. No. 08/600,802, filed Feb. 13, 1996 now abandoned, which is a continuation of application Ser. No. 08/205,035, filed Mar. 01, 1994, U.S. Pat. No. 5,515,516.

This application is related to application Ser. No. 08/204, 736, entitled "High Performance Symmetric Arbitration Protocol with Support for I/O Requirements," and 08/204, 867, entitled "Auto-Configuration Support for Multiple Processor-Ready Pair or FRC-Master/Checker Pair," both of which are assigned to the assignee of the present application and filed concurrently herewith.

BACKGROUND OF THE INVENTION

1. Field of the Invention

The present invention pertains to the field of computer system buses. More particularly, this invention relates to initialization of agents in a bus system.

2. Background

In modern computer systems, multiple agents are often coupled to a bus and arbitrate for the use of that bus. An arbitration scheme is employed which determines which agent coupled to the bus should have ownership of the bus at any given moment. A computer system may include multiple processors, or similar devices, that are somewhat alike in their bus usage requirements. Such multiple processors are referred to as "symmetric agents".

In some arbitration schemes a central arbiter keeps track of which agent is to be given ownership of the bus. In other, distributed arbitration schemes, each agent on the bus keeps track of which agent is the last or current owner of the bus, thereby allowing each agent to know which agent will be given priority for ownership next.

In arbitration schemes where each agent keeps track of the last or current owner of the bus, it may be necessary to initialize each agent whenever the system is reset such that all agents are in agreement as to who has priority for bus ownership. This agent initialization must be performed accurately, however it is often desirable to reduce the amount of logic required to perform the initialization due to its low frequency of use. That is, initialization often occurs only at system reset; thus, it is undesirable to expend significant overhead in supporting initialization schemes.

One common way of initializing agents for arbitration is to set a jumper on each agent. That is, each agent participating in arbitration for the bus has a set of pins accessible to the system user. By connecting the proper combination of pins with a jumper, the system user is able to assign that agent a particular arbitration identification. In order to change the arbitration identification for that particular agent the user must change the setting of the jumper. Furthermore, in systems requiring each agent to have a unique arbitration identification, the system user must ensure that jumpers for two agents are not set the same, thereby giving them the same arbitration identification. Thus, to alter the arbitration identifications for all agents on the bus requires physical manipulation of every jumper on every agent.

Another method of initializing agents for arbitration involves a signal being sent to multiple agents during multiple clock cycles. During a first dock cycle, information indicating the arbitration identification for the first agent is latched onto the first agent through one (or perhaps more) of the agent's pins. During a second clock cycle, information indicating the arbitration identification for a second agent is latched onto the second agent over the identical pin on the second agent. Thus, a different input line is driven to a common input pin of a different processor on each clock cycle. This sequence is continued for as many clock cycles as are necessary to latch arbitration identification information onto each agent. One drawback to this approach is that it requires multiple clock cycles to initialize all agents on the bus for arbitration.

In modern computer systems, the importance of system speed is ever-increasing. Thus, it would be advantageous to provide a mechanism for initializing arbitration agents which could be accomplished in a minimal amount of time.

Additionally, many modem computer systems can have a varying number of agents on a bus. The number of agents on a particular bus may vary between systems, or may vary over time for a given system. Thus, it would be advantageous to provide a versatile system which supports a variable number of agents with a minimal amount of additional logic and expense, and the performance of which is independent of the number of agents.

In addition, in many modem computer systems the location of agents on a bus may vary. Thus, it would be advantageous to provide an initialization mechanism which is identical for each agent, yet provides each agent with a unique identity within the system.

The present invention provides a solution to the problems of the prior art.

SUMMARY AND OBJECTS OF THE INVENTION

An initialization mechanism for symmetric arbitration agents is described. Multiple agents are coupled to a bus through a set of arbitration pins. Each bus agent has an arbitration counter which it uses to keep track of which agent is the current or last owner of the bus. All bus agents agree on which of them will be the priority agent at system reset and thus be allowed first ownership of the bus. The arbitration counter for each agent is initialized at system reset so that all agents give the priority agent the first opportunity for ownership of the bus.

Each agent initializes its arbitration counter according to its agent identification. Each agent determines its own agent identification at system reset based on a single signal driven to one of its arbitration pins. The arbitration pins are interconnected between the agents such that each agent determines a unique agent identification for itself. This determination is based on which of the arbitration pins is active at system reset and the number of bus agents allowed on the bus.

After determining its agent identification, each bus agent initializes its arbitration counter such that every agent agrees which agent is the priority agent. This initialization is based on the identity of the priority agent, the agent being initialized, and the maximum number of agents allowed on the bus.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by one skilled in the art that the present invention may be practiced without these specific details. In other instances, well known methods, procedures, components, and circuits have not been described in detail so as not to obscure aspects of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
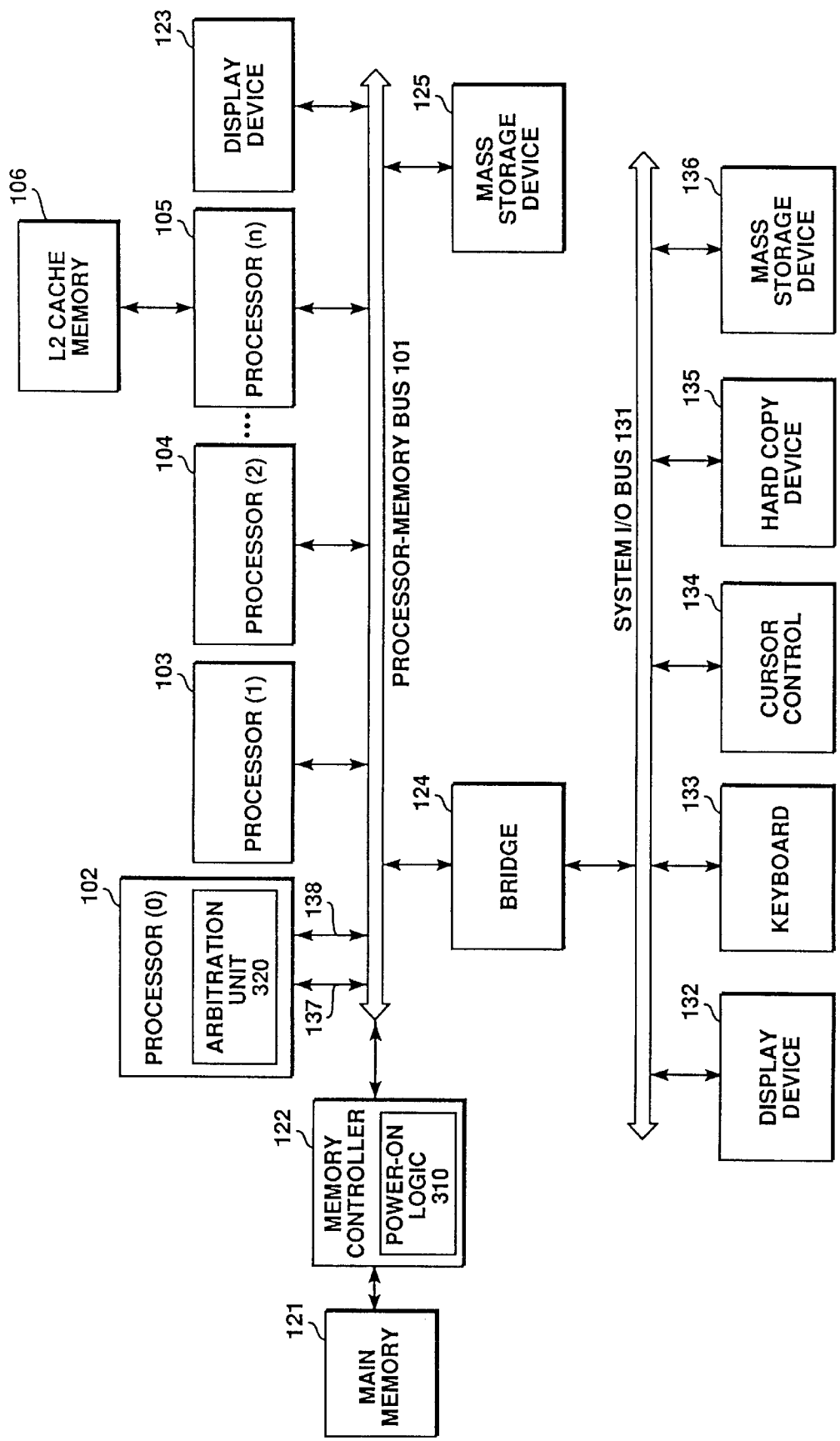
FIG. 1 shows an overview of an exemplary multiprocessor computer system of the present invention.

FIG. 1 shows an overview of an example multiprocessor computer system of the present invention. The computer system generally comprises a processor-memory bus or other communication means 101 for communicating information between one or more processors 102, 103, 104 and 105. Processor-memory bus 101 includes address, data and control buses. Processors 102 through 105 may include a small, extremely fast internal cache memory, commonly referred to as a level one (L1) cache memory for temporarily storing data and instructions on-chip. In addition, a bigger, slower level two (L2) cache memory 106 can be coupled to a processor, such as processor 105, for temporarily storing data and instructions for use by processor 105. In one mode, the present invention may include Intel® architecture microprocessors as processors 102 through 105; however, the present invention may utilize any type of microprocessor architecture, or any of a host of digital signal processors.

Processor 102, 103, or 104 may comprise a parallel processor, such as a processor similar to or the same as processor 105. Alternatively, processor 102, 103, or 104 may comprise a coprocessor, such as a digital signal processor. In addition, processors 102 through 105 may include processors of different types.

Processor 102 is coupled to processor-memory bus 101 over request bus 137 and bus 138. Processor 102 also contains an arbitration unit 320 which controls both when processor 102 requests access to processor-memory bus 101 and when processor 102 is given ownership of bus 101. Request bus 137 transfers the signals associated with bus arbitration between processor 102 and the remaining agents coupled to processor-memory bus 101. The remaining signals transferred between processor 102 and processor-memory bus 101 are transferred over bus 138. These remaining signals include data signals, address signals, and additional control signals. In one embodiment, request bus 137 and bus 138 are part of processor-memory bus 101.

The other processors 103 through 105 also include an arbitration unit 320 and are coupled to processor-memory bus 101 with a request bus 137 and bus 138 as shown with regard to processor 102. In one embodiment, only the symmetric agents coupled to processor-memory bus 101 include an arbitration unit 320. In an alternate embodiment, all agents coupled to processor-memory bus 101 include an arbitration unit 320.

The processor-memory bus 101 provides system access to the memory and input/output (I/O) subsystems. A memory controller 122 is coupled with processor-memory bus 101 for controlling access to a random access memory (RAM) or other dynamic storage device 121 (commonly referred to as a main memory) for storing information and instructions for processors 102 through 105. A mass data storage device 125, such as a magnetic disk and disk drive, for storing information and instructions, and a display device 123, such as a cathode ray tube (CRT), liquid crystal display (LCD), etc., for displaying information to the computer user may be coupled to processor-memory bus 101.

An input/output (I/O) bridge 124 may be coupled to processor-memory bus 101 and system I/O bus 131 to provide a communication path or gateway for devices on either processor-memory bus 101 or I/O bus 131 to access or transfer data between devices on the other bus. Essentially, bridge 124 is an interface between the system I/O bus 131 and the processor-memory bus 101.

I/O bus 131 communicates information between peripheral devices in the computer system. Devices that may be coupled to system bus 131 include a display device 132, such as a cathode ray tube, liquid crystal display, etc., an alphanumeric input device 133 including alphanumeric and other keys, etc., for communicating information and command selections to other devices in the computer system (e.g., processor 102) and a cursor control device 134 for controlling cursor movement. Moreover, a hard copy device 135, such as a plotter or printer, for providing a visual representation of the computer images and a mass storage device 136, such as a magnetic disk and disk drive, for storing information and instructions may also be coupled to system bus 131.

In some implementations, it may not be required to provide a display device for displaying information. Certain implementations of the present invention may include additional processors or other components. Additionally, certain implementations of the present invention may not require nor include all of the above components. For example, processors 102 through 104, display device 123, or mass storage device 125 may not be coupled to processor-memory bus 101. Furthermore, the peripheral devices shown coupled to system I/O bus 131 may be coupled to processor-memory bus 101; in addition, in some implementations only a single bus may exist with the processors 102 through 105, memory controller 122, and peripheral devices 132 through 136 coupled to the single bus.

Figure 2:
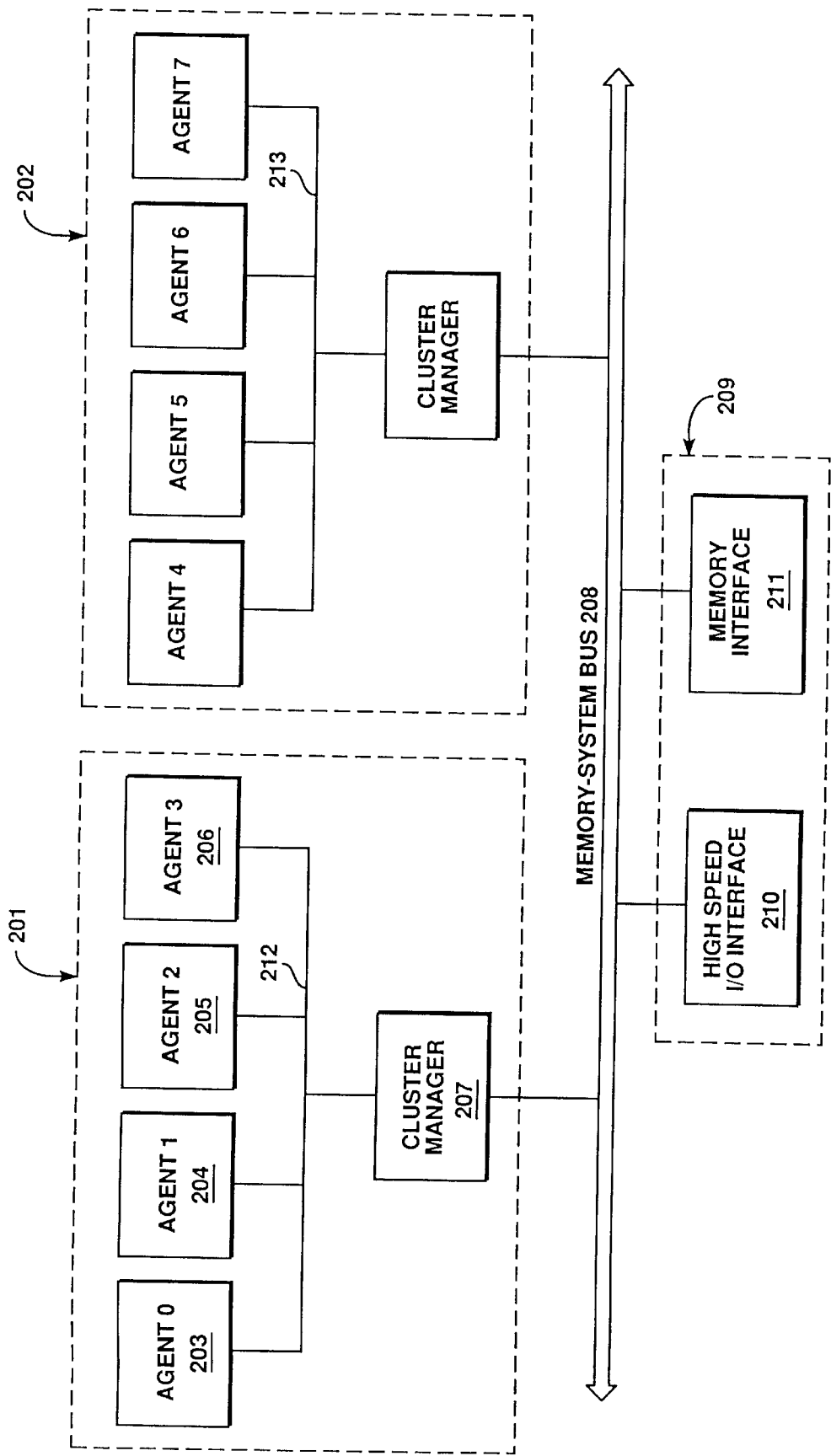
FIG. 2 is a block diagram showing an exemplary bus cluster system of the present invention.

FIG. 2 is a block diagram showing an exemplary bus cluster system of the present invention. The present invention can apply to multiprocessor computer systems having one or more clusters of processors. FIG. 2 shows two such clusters 201 and 202. Each of these clusters are comprised of a number of agents. For example, cluster 201 is comprised of four agents 203–206 and a duster manager 207, which may include another cache memory (not shown), coupled to bus 212. Agents 203–206 can include microprocessors, co-processors, digital signal processors, etc.; for example, agents 203 through 206 may be the same as processor 102 shown in FIG. 1, being coupled to bus 212 via a request bus 137 and bus 138. Cluster manager 207 and its cache are shared between these four agents 203–206. Each cluster is coupled to a memory system bus 208, which in one embodiment is processor-memory bus 101 of FIG. 1. These clusters 201–202 are coupled to various other components of the computer system through a system interface 209. The system interface 209 includes a high speed I/O interface 210 for interfacing the computer system to the outside world and a memory interface 211 which provides access to a main memory, such as a DRAM memory array (these interfaces are described in greater detail in FIG. 1). In one embodiment, high speed I/O interface 210 is bridge 124 of FIG. 1, and memory interface 211 is memory controller 122 of FIG. 1.

Certain implementations of the present invention may not require nor include all of the above components. For example, cluster 201 or 202 may comprise fewer than four agents. Additionally, certain implementations of the present invention may include additional processors or other components.

In one embodiment, each cluster also includes a local memory controller and/or a local I/O bridge. For example, cluster 201 may include a local memory controller 265 coupled to processor bus 212. Local memory controller 265 manages accesses to a RAM or other dynamic storage device 266 contained within cluster 201. Cluster 201 may also include a local I/O bridge 267 coupled to processor bus 212. Local I/O bridge 267 manages accesses to I/O devices within the duster, such as a mass storage device 268, or to an I/O bus, such as system I/O bus 131 of FIG. 1.

Figure 3:
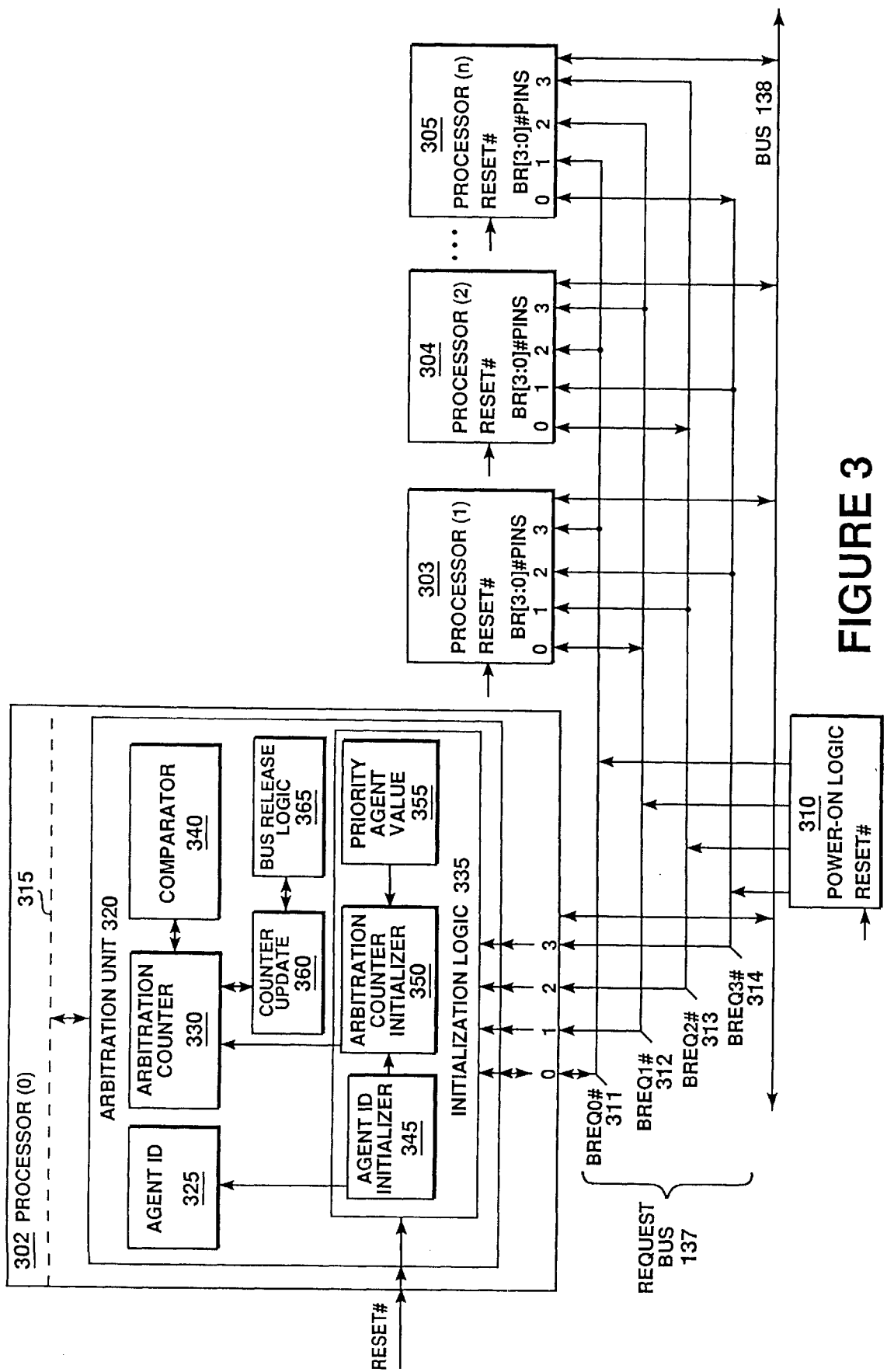
FIG. 3 shows an exemplary interconnection between bus agents of the present invention.

FIG. 3 shows an exemplary interconnection of four or more symmetric agents coupled to a bus, e.g. processor-system bus 101 of FIG. 1, or bus 212 of FIG. 2. It should be noted that the interconnection of FIG. 3 is exemplary only; the scope of the present invention is not limited to the interconnection shown. Other interconnection schemes may be utilized which are within the spirit and scope of the present invention. Processors 302 through 305 are exemplary only; the agents shown in FIG. 3 can include microprocessors, co-processors, digital signal processors, etc. Furthermore, other agents besides processors may be arbitrating for access to the bus, such as cluster manager 207 of FIG. 2. In one embodiment, these other agents are interconnected in the manner shown in FIG. 3. In an alternate embodiment, these other agents are coupled to agents 302 through 305 through a separate arbiter (not shown).

In one embodiment of the present invention, the address, data, and most control signals are bussed together. That is, address or data signals issued by one processor are received by identical pins on every other processor on the bus. However, the control signals involved in bus arbitration are not bussed together; these control signals are wired together using a scheme defined as "rotating interconnect".

FIG. 3 shows the rotating interconnect scheme of request bus 137. Address signals, data signals, and additional control signals are transferred to other agents coupled to processor-memory bus 101 of FIG. 1 (or bus 212 of FIG. 2) via bus 138. In one embodiment, request bus 137 and bus 138 are part of processor-memory bus 101 shown in FIG. 1. In an alternate embodiment, request bus 137 and bus 138 are part of bus 212 shown in FIG. 2. Additional details of processor-system bus 101 and bus 212 have not been included so as not to clutter the drawings and obscure the present invention.

FIG. 3 shows the rotating interconnect scheme. Processors 302, 303, 304 and 305, as shown in FIG. 3, are interconnected by a set of control lines 311, 312, 313 and 314. In one embodiment, these control lines are defined as "BREQ#" control lines. In one mode, the BREQ# control lines 311 through 314 are the request bus 137 of FIG. 1.

Processor 302 shown in FIG. 3 is described in additional detail. The additional elements shown in processor 302 are also included in each other processor 303 through 305, however, this additional detail has not been shown in processors 303 through 305 so as not to clutter the drawings.

Processor 302 contains an arbitration unit 320 which serves as the arbitration interface between the bus, e.g. processor-system bus 101, and the remainder of processor 302, i.e., the internal processor logic shown by dashed line 315. Arbitration unit 320 receives a signal from the internal processor logic 315 when processor 302 requires access to bus 101, e.g. for a memory read transaction; arbitration unit 320 then manages when processor 302 is allowed ownership of the bus. Other control, address and data signals used for purposes other than bus arbitration are also carried between bus 101 and processor 302 by other interface logic, however these additional signals have not been shown so as not to clutter the drawings and obscure the present invention.

In one embodiment of the present invention, additional interface logic exists between arbitration unit 320 and the BREQ[3:0]# pins of processor 302. This additional logic may modify the signal paths for the arbitration signals between the BREQ[3:0]# pins and arbitration unit 320.

In one embodiment, arbitration unit 320 contains a two-bit agent identification 325, a two-bit arbitration counter 330, initialization logic 335, a comparator 340, counter updating logic 360, and bus release logic 365. Arbitration unit 320 asserts a signal on the BR0# pin when processor 302 is requesting bus ownership, and also receives bus ownership requests from bus agents input on the BR[3:0]# pins. It should be noted that when arbitration unit 320 is issuing a bus request signal on its BR0# pin, arbitration unit 320 is also receiving this signal as an input. In addition, signals are also received by arbitration unit 320 over one of the BR[3:0]# pins during system reset, as described in more detail below.

Comparator 340 determines whether processor 302 has ownership of the bus when processor 302 is requesting ownership. In one embodiment, comparator 340 determines whether processor 302 is allowed ownership of the bus by comparing the arbitration counter 330 to zero. When the arbitration counter equals zero, processor 302 is allowed ownership of the bus, as discussed in more detail below. Alternatively, comparator 340 may determine processor 302 is allowed ownership of the bus when arbitration counter 330 equals any particular non-zero value.

Counter updating logic 360 updates arbitration counter 330 when a symmetric agent releases the bus, as described in more detail below. In one embodiment, counter updating logic 360 updates arbitration counter 330 such that the next symmetric agent requesting ownership following the modulo-4 wraparound scheme is given bus ownership. In an alternate embodiment, counter updating logic 360 increments arbitration counter 330 by one in a modulo-4 wraparound manner. It will be understood by those skilled in the art, however, that other updating algorithms may be used which are within the spirit and scope of the present invention.

Bus release logic 365 determines when the current owner of the bus releases the bus. In one mode, a symmetric agent's release of the bus is known by monitoring which BREQ# lines of the control bus 137 are asserted. Alternatively, this could be determined by an individual signal asserted to processor 302 from the current owner.

Initialization logic 335 initializes both the agent identification 325 and the arbitration counter 330. In one embodiment, this initialization is done at system reset. An agent identification initializer 345 determines the proper agent identification 325 based on the BR[3:0]# pin sampled active when a RESET# signal is asserted, as described in more detail below. An arbitration counter initializer 350 determines the initial value for arbitration counter 330 when a RESET# signal is asserted, based on the agent identification determined by agent identification initializer 345 and the priority agent value 355, as discussed in more detail below. Thus, initialization logic 335 calculates an agent identification value for processor 302, and calculates and stores the initial arbitration counter value as arbitration counter 330.

In order to participate in bus arbitration, each agent on the bus maintains an arbitration counter. The arbitration counter informs its agent which agent has ownership of the bus. Each agent updates its arbitration counter when an agent on the bus releases ownership of the bus, as discussed above.

In one embodiment of the present invention, one or more additional non-symmetric, "high priority" agents may reside on the bus. This "high priority" agent obtains ownership of the bus, when requested, over the symmetric agent with the highest priority. The symmetric agents do not update their arbitration counters in response to a "high priority" agent releasing ownership of the bus.

In the arbitration scheme supported by one mode of the present invention, each agent drives a single request line to request bus ownership while observing request lines from other agents on the bus. As shown in the mode of FIG. 3, each agent has four arbitration pins: a BR0# pin, a BR1# pin, a BR2# pin, and a BR3# pin. To request bus ownership, an agent drives its request line, BR0#. As can be seen from FIG. 3, the BR0# pin of each agent is coupled to a different input pin for each other agent. Thus, each agent receives the signal from the requesting agent's BR0# pin on a different input pin.

Each agent determines the owner of the bus based on the value of its own arbitration counter. As is described in more detail below, the arbitration counters for each agent refer to the same agent, even though the values of the counters are different. An agent knows it is the last or current owner of the bus when its arbitration counter equals zero.

The agent with the highest priority (i.e., the agent which will have priority for ownership of the bus next) is the agent whose arbitration counter plus one equals zero. Thus, when an agent's arbitration counter equals zero, that agent has ownership of the bus, assuming it currently requests ownership. Those skilled in the art will understand that a value other than zero could be used to indicate priority, and that variations on the described scheme can be used, such as counting downward to three instead of upward to zero, or the like.

The arbitration counters within each bus agent, however, must account for the rotating interconnect scheme. For example, if the arbitration counter of processor 303 is equal to three, then, using a modulo-wraparound system, its arbitration counter value plus one is equal to zero. Thus, processor 303 is the highest priority agent. However, each agent 302 through 305 receives inputs from each other agent over a different BR[3:0]# pin. Thus, an output from BR0# of processor 303 is received as an input on BR3# of processor 304. Since processor 303 is the highest priority agent, and processor 304 receives inputs from processor 303 on its BR3# pin, processor 304's arbitration counter value plus one is equal to three. Thus, processor 304's current arbitration counter value equals two.

That is, processor 304 initializes its arbitration counter such that the agent with the highest priority is processor 303. Processor 304 receives arbitration input from processor 303 over its BR3# pin, so after the arbitration counters are incremented processor 304's arbitration counter is equal to three. This indicates to processor 304 that the agent coupled to its BR3# pin currently has the highest priority, i.e., processor 303.

Furthermore, following the modulo-wraparound scheme of the arbitration system, when processor 303 has completed its bus ownership, processor 304 is the highest priority agent. Thus, its arbitration counter value was correctly valued at two, because it would be incremented to three when processor 303 took ownership of the bus, then incremented to zero for the next owner, which it views as itself (because its arbitration counter value is zero).

From the above discussion it can be seen that each processor on the bus observes the agent with ownership of the bus according to the following rules: if an agent's arbitration counter equals zero, then the agent observes itself as owner of the bus (if it is driving its BR0# line); if an agent's arbitration counter equals n, where n does not equal zero, then the agent observes the bus owner as the agent coupled to its BRn# pin.

Each processor thus allows the agent coupled to its BRn# pin ownership of the bus when the processor's arbitration counter equals n. However, if no signal is received over its BRn# pin then the processor knows the agent which requests bus ownership over that pin is not currently requesting ownership.

One mode of the interconnection of BR# pins between agents 302 through 305 is shown in Table 1. The BREQ# control line 311 through 314 which connects the BR# pins is also shown.

TABLE 1

|  | Agent 0 | Agent 1 | Agent 2 | Agent 3 |
|---|---|---|---|---|
| BREQ0# | BR0# | BR3# | BR2# | BR1# |
| BREQ1# | BR1# | BR0# | BR3# | BR2# |
| BREQ2# | BR2# | BR1# | BR0# | BR3# |
| BREQ3# | BR3# | BR2# | BR1# | BR0# |

In one embodiment of the present invention, power-on logic 310 asserts a set of initialization signals during system reset which provides each agent on the bus with the proper configuration values. In one mode, system reset is known by processors 302 through 305 by assertion of a RESET# signal which is input to each processor and power-on logic 310. The RESET# signal is asserted by the computer system, for example, whenever the system is powered-on or a physical "reset" switch is actuated. Alternatively, the RESET# signal may be asserted at any predetermined event, e.g. at a particular time every day, or at a random event, such as after the system has been operating for a random period of time.

The initialization signals asserted by power-on logic 310 include, for example, signals indicating the agent identifications for each processor, signals indicating the error checking configurations for the system, etc. The location of the power-on logic 310 within the system may vary. In one embodiment of the present invention, power-on logic 310 is contained within memory controller 122 of FIG. 1. In an alternate embodiment, power-on logic 310 is contained within another agent on processor-system bus 101, such as one of the processors 102 through 105 of FIG. 1, or cluster manager 207 of FIG. 2, or in a dedicated arbitration agent.

The arbitration counter for each agent is initialized at system reset according to the rotating interconnect scheme discussed above. The initial value of the arbitration counter for a given agent is based on the agent identification for that agent. Each agent's arbitration counter is initialized to a unique value in order to support the arbitration scheme described above. If the arbitration counters for two agents were initialized to the same value, then eventually the arbitration counters for the two agents would both be zero. Since each agent has ownership of the bus when its arbitration counter equals zero, conflicting signals could be issued onto the bus by the two agents. Thus, this situation should be avoided.

The arbitration counter initialization for a given agent is dependent on the agent identification of that agent. Thus, assigning each agent on the bus a unique agent identification ensures that the arbitration counters are initialized to different values for each agent.

During system reset, power-on logic 310 asserts a set of initialization signals. Among this set is a signal over one of the following control lines: BREQ0# control line 311, BREQ1# control line 312, BREQ2# control line 313, or BREQ3# control line 314. In one embodiment, which BREQ# control line 311 through 314 will be asserted is predetermined in the power-on logic 310. That is, power-on logic 310 is preconfigured to assert the same control line at every system reset. In one embodiment, which control line power-on logic 310 asserts is hardwired within power-on logic 310. In an alternate embodiment, a jumper is set on power-on logic 310; this jumper could be varied among different systems or between system resets within the same system.

In an alternate embodiment, power-on logic 310 is not preconfigured to assert the same BREQ# control line 311 through 314 at every system reset. In one embodiment, which control line is asserted is determined by the value stored in a particular register; whatever value is randomly determined to be in the register at system reset determines which control line is asserted. In another embodiment, a FLASH memory device indicates which control line to assert at reset; the FLASH memory device may indicate the same control line for every reset, or alternatively, it may update which control line to assert after every reset.

Each agent initially assigns itself a unique agent identification value based on the BREQ# control line which is active at system reset. In one mode, the agent identification is determined according to the following formula:

$$id = (-n) \bmod \text{max\_agents} \quad (1)$$

where id is the agent identification, n is the number of the BRn# pin sampled active during system reset, and max_agents is the maximum number of symmetric agents on the bus which can participate in arbitration. Thus, whenever an agent samples one of its BR# pins active during system reset, it assigns itself an agent identification value based on formula (1).

In one mode of the present invention, a bus 101 has a maximum of four processors 302 through 305 coupled to it. Thus, the max_agents value is equal to four, which is hardwired into each processor 302 through 305. It should be noted that the max_agents value is the maximum number of symmetric agents which can participate in arbitration on the bus, not the number of agents actually coupled to the bus. In addition, the max_agents value does not include any "high priority" agents coupled to the bus as discussed above. Although the value is hardwired to four, fewer than four processors could be coupled to bus 101. For example, if processor 305 of FIG. 3 were not coupled to bus 101, then no bus ownership request signal would be asserted on BREQ3# control line 314. Thus, when processor 304's arbitration counter equals one it does not receive an input signal on its BR1# pin. Thus, as discussed above, the arbitration counter is updated accordingly. Thus, effectively the agents simply ignore a processor which is not coupled to the bus.

It will be understood by those skilled in the art that the maximum number of processors which can participate in arbitration may be easily changed to accommodate a larger number of processors. It should also be understood that the computer system of the present invention may have more than four processors in a multiple-level bus hierarchy, as shown in FIG. 2.

It should be noted that in a multiple-level bus hierarchy, as shown in FIG. 2, each agent on a bus has a unique agent identification for that bus (i.e., the bus it accesses through arbitration). However, this agent identification may be duplicated by another agent on another bus. For example, one of the agents coupled to bus 212 of FIG. 2 may have an agent identification of three. In addition, one of the agents coupled to bus 213 may also have an agent identification of three.

Each agent utilizes formula (1) to determine its agent identification. Yet, the resulting value is different for each agent due to the rotating interconnect scheme. The agent identification for each processor 302 through 305 of FIG. 3, based on which BREQ# control line is active, is shown in Table 2.

TABLE 2

|  | Processor 302 | Processor 303 | Processor 304 | Processor 305 |
| --- | --- | --- | --- | --- |
| BREQ0# active | agent id 0 | agent id 1 | agent id 2 | agent id 3 |
| BREQ1# active | agent id 3 | agent id 0 | agent id 1 | agent id 2 |
| BREQ2# active | agent id 2 | agent id 3 | agent id 0 | agent id 1 |
| BREQ3# active | agent id 1 | agent id 2 | agent id 3 | agent id 0 |

It should be noted that if fewer than four symmetric agents are coupled to the bus then the agent identifications are still as shown in Table 2 for those agents coupled to the bus. For example, if only processors 302 and 304 were coupled to the bus and the BREQ0# control line is active at system reset, then processor 302's agent identification is zero and processor 302's agent identification is two. Determination of bus ownership is the same as discussed above.

Figure 4:
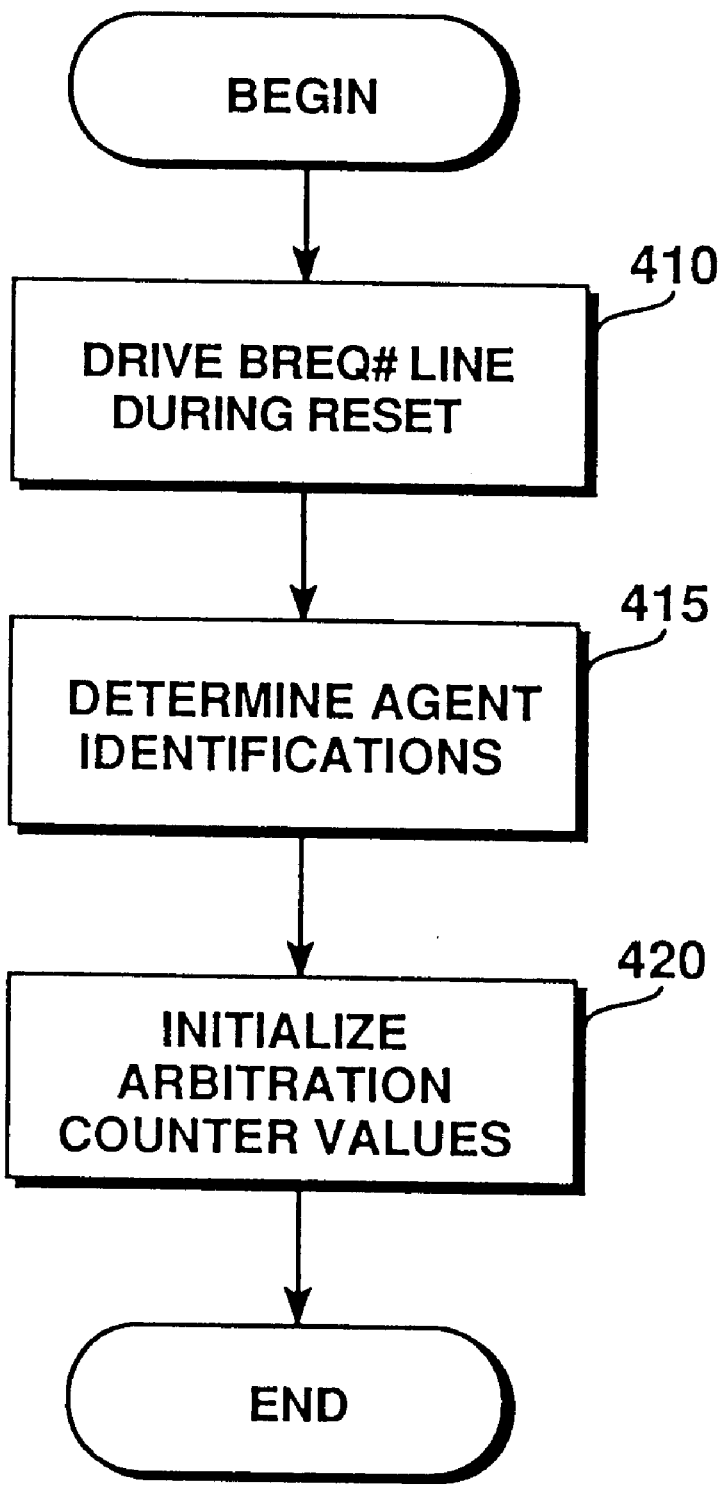
FIG. 4 is a flowchart describing the steps of initializing a bus agent of the present invention.

The steps for initializing an agent according to the present invention are shown in FIG. 4. Power-on logic 310 asserts one of the BREQ# control lines 311 through 314 at system reset, step 410. Given the assertion of the RESET# signal and a BREQ# control line, each agent on the bus determines its agent identification, step 415, as described above.

Once the agent identification is determined, each agent initializes its own arbitration counter, step 420. In one mode, an agent's arbitration counter is initialized according to the following formula:

$$\text{counter value} = (\text{priority\_agent} - \text{agent\_id} - 1) \bmod \text{max\_agents} \quad (2)$$

where counter value is the agent's arbitration counter value at system reset, priority_agent is the agent which has ownership of the bus first, agent_id is the agent identification for this particular agent as determined in step 415, and max_agents is the maximum number of agents on the bus which can participate in arbitration, as discussed above.

The priority_agent is the agent identification value corresponding to the agent which has the highest priority for ownership of the bus after system reset, not counting the "high priority" agents, if any. According to formula (2), the agent whose agent identification is the same as the priority agent identification value calculates its arbitration counter value to be one less than the max_agents value (i.e., three in the examples above where max_agents is four). Thus, when the arbitration counters within each agent are incremented to determine which agent has the highest priority for bus ownership, the priority agent's arbitration counter is incremented to zero (thereby indicating that the priority agent has the highest priority).

The priority agent identification value is agreed upon by all agents on the bus. That is, each agent on the bus is preconfigured with the agent identification value of the priority agent; in one embodiment, the agent identification value of the priority agent is hardwired into each agent. In an alternate embodiment the priority agent is determined through a shift-register which is updated after every reset. Alternatively, the priority agent may be determined randomly for every reset.

It should be noted that the priority agent of formula (2) is the agent identification value of the agent which will have ownership of the bus first after reset (not taking into account any "high priority agents," discussed above). Which processor, or agent, corresponds to the priority agent varies. For example, assume each agent has the priority agent identification value hardwired to agent 0. However, which processor 302 through 305 is actually agent 0 is dependent on the BREQ# control line 311 through 314 asserted at system reset. Thus, although the priority agent identification value may be fixed, the actual processor which has that agent identification can be varied. Thus, any processor on the bus can be the priority agent.

For example, in FIG. 3, if the priority agent is the agent with an agent identification value of one, Table 3 shows the counter value initializations for each processor 302 through 305, according to formula (2), depending on which BREQ# control line 311 through 314 is active at system reset.

TABLE 3

|  | BREQ0# active | BREQ1# active | BREQ2# active | BREQ3# active |
| --- | --- | --- | --- | --- |
| Processor 302 | 0 | 1 | 2 | 3 |
| Processor 303 | 3 | 0 | 1 | 2 |
| Processor 304 | 2 | 3 | 0 | 1 |
| Processor 305 | 1 | 2 | 3 | 0 |

Thus, it can be seen from Table 3 that any processor on the bus can have the highest priority at system reset.

Therefore, as shown in the discussion above, in one embodiment the agents on a bus which are interconnected in a rotating manner are initialized by the assertion of a BREQ# control line, or other suitable signal, during system reset. That is, the single assertion of a single signal line initializes all the agents on the bus for arbitration, regardless of the number of agents.

It will be understood by those skilled in the art that although the above description refers to asserting different signals, deasserting the same signals could accomplish the same result. This could be accomplished, for example, by inverting the signals at either their source or destination, or through the use of different signals.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, an initialization mechanism for symmetric arbitration agents has been described.

What is claimed is:

1. An apparatus comprising:

a bus; and one or more agents coupled to the bus, wherein each respective agent includes logic to generate a unique identification for the respective agent based on which input of a plurality of inputs receives an initialization signal from the bus.

2. The apparatus of claim 1, wherein each respective agent further comprises logic to determine an initial arbitration priority for the respective agent based on the unique identification of the respective agent.

3. A computer system comprising:

a bus; and a plurality of symmetric bus agents coupled to the bus, wherein each respective symmetric bus agent includes circuitry to generate a unique identification for the respective symmetric bus agent based on which input of a plurality of inputs receives an initialization signal from the bus.

4. The computer system of claim 3, wherein each respective symmetric bus agent further comprises logic to determine an initial arbitration priority for the respective symmetric bus agent based on the unique identification of the respective symmetric bus agent.

5. A method for initializing one or more bus agents coupled to a bus, the method comprising the steps of:

(a) driving an initialization signal on the bus; and (b) generating a unique identification by each of the one or more bus agents based on which input of a plurality of inputs receives the initialization signal from the bus.

6. The method of claim 5, further comprising the step of:

(c) each of the one or more bus agents determining an initial arbitration priority for itself based on its unique identification.

\* \* \* \* \*